C. ROY.
Wire-Rolling Mill.
No. 211,672. Patented Jan. 28, 1879
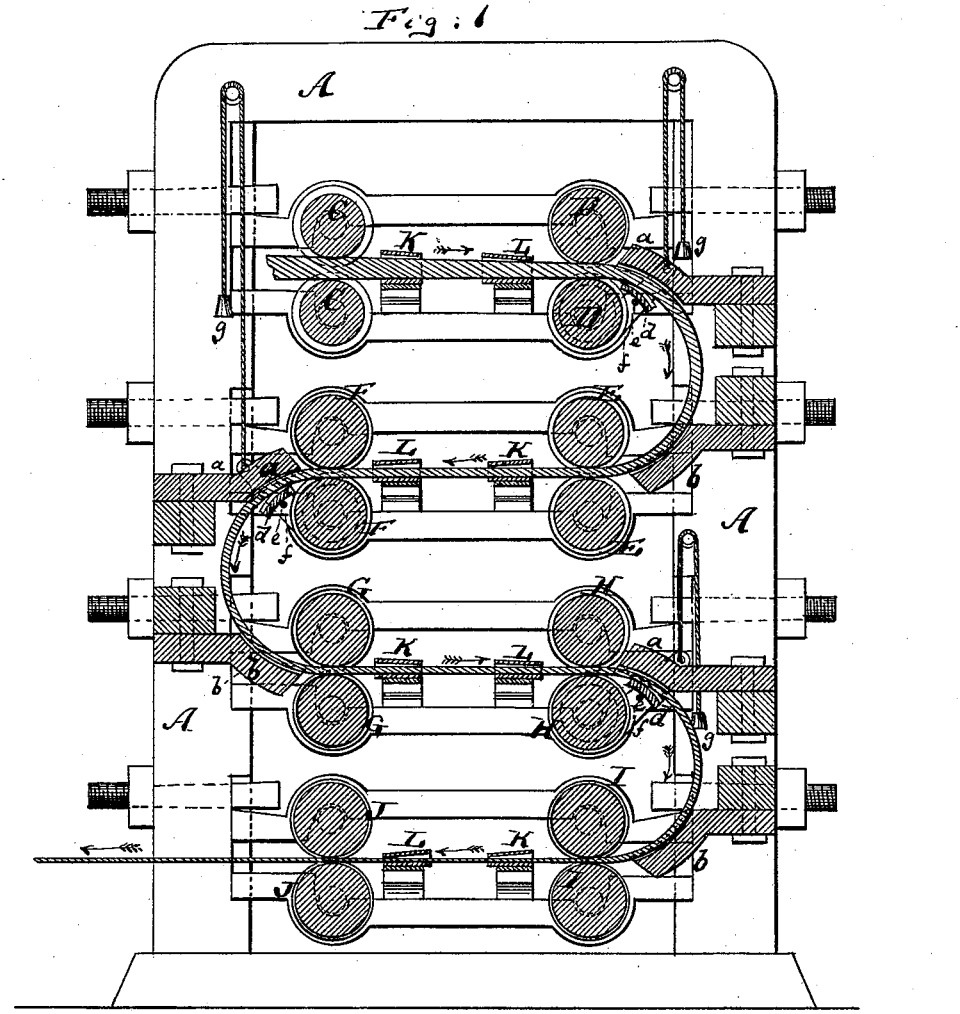
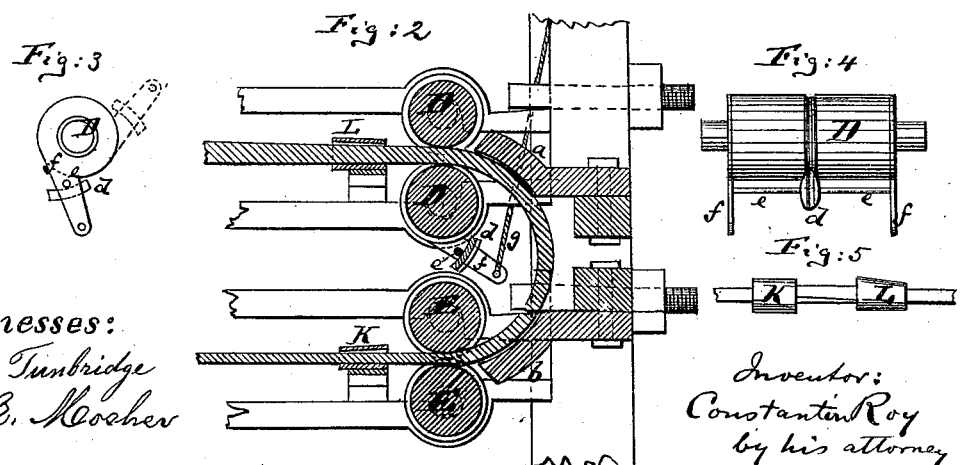
Witnesses:
J. C. Tunbridge
T. B. Mosher
Inventor:
Constantin Roy
by his attorney
A. v. Briesen

UNITED STATES PATENT OFFICE.

CONSTANTIN ROY, OF WITTEN-AN-DER-RUHR, PRUSSIA.

IMPROVEMENT IN WIRE-ROLLING MILLS.

Specification forming part of Letters Patent No. 211,672, dated January 28, 1879; application filed September 26, 1878; patented in Germany, July 25, 1877.

*To all whom it may concern:*

Be it known that I, CONSTANTIN ROY, of Witten-an-der-Ruhr, Prussia, have invented a new and Improved Wire-Rolling Mill, of which the following is a specification:

Figure 1 is a vertical central section of my improved wire-rolling mill; Fig. 2, a similar section of part of the same, showing the guide $d$ lowered. Fig. 3 is a detail side view of the guide $d$; Fig. 4, a detail face view thereof on the roller D. Fig. 5 is a detail top view of the twisting-guide K and plain guide L.

Similar letters of reference indicate corresponding parts in all the figures.

This invention relates to a new arrangement of rollers and guides for converting a thick blank of metal into wire of suitable cross-section.

The invention consists in the combination of certain curved and movable guides with the rollers that are in the same vertical plane, and also, in the new combination of rollers and other parts of the machine, as hereinafter more fully described.

In a suitable frame, A, are journaled eight pairs of grooved rollers, C, D, E, F, G, H, I, and J, which are arranged in two vertical rows, C F G J and D, E, H, and I, and in four horizontal rows, as shown. They are provided with suitable means for adjusting their distances apart, and are rotated by means of toothed wheels or otherwise, so that each pair of rollers may receive the exact degree of velocity required.

The rectangular blank to be reduced to wire is first introduced between the rollers C C, which impart an oval shape to the same. The blank thus shaped passes next through a twisting-guide, K, which twists it or turns it over sidewise at an angle of about ninety degrees, thereby bringing it in proper position to be acted upon by the rollers D D. After having traversed another proper guide, L, the blank reaches the rollers D D, which are grooved to receive it and to further reduce its cross-section and make it rectangular again. From the rollers D D the blank passes along curved and properly-grooved guides $a\ b$ to the rollers E E, which are grooved to impart to the blank an oval cross-section smaller than ever before. The groove in the lower guide, $b$, is properly tapering to permit this operation.

Between the guides $a$ and $b$ is a vibrating guide, $d$, which is of segmental form, and secured to a cross-bar, $e$, from which arms $f\ f$ extend around the journals of the lower roller, D. Weights $g\ g$ seek to elevate the guide $d$ to the position shown in Fig. 1. The guide $d$ yields and moves downward in case the blank should be stretched between the rollers D and E, or in case the rollers E E draw faster than the rollers D deliver the blank. In this case the guide $d$ moves down, as shown in Fig. 2, between the rollers D E, and remains in this position until the occasion for its descent is removed, whereupon it will be raised again by the weights $g$. Having thus reached the rollers E E, the blank passes onto the next succeeding rollers in the same manner as already described, there being a twisting-guide, K, between every pair of rollers in a horizontal plane, and guides $a\ b\ d$ between every other pair of rollers in each vertical plane. The blank is gradually reduced, being alternately pressed into rectangular and into oval cross-sections, as already stated.

The grooves in the last pair of rollers, J J, may be round, rectangular, flat, or of such other form as will correspond with the final form of the wire to be produced.

I claim—

1. The combination of the vibrating curved guide $d$ with the weight $g$ and with the rollers in the same vertical plane, substantially as herein shown and described.

2. The combination of the guides $a\ b$ with the rollers D E and guide $d$, substantially as herein shown and described.

3. In a wire-rolling mill, the combination of series of rollers, arranged in two vertical rows and in several horizontal rows, with the twisting-guides K K and with the guides $a$, $b$, and $d$, for operation substantially as herein shown and described.

This specification signed by me this the 18th day of June, 1878.

CONSTANTIN ROY.

Witnesses:
ALBERT PAFT,
ALBANO BRAND.